United States Patent
Haag et al.

(10) Patent No.: US 11,456,916 B2
(45) Date of Patent: Sep. 27, 2022

(54) OPERATION AND ARCHITECTURE OF A CENTRAL OFFICE POINT OF DELIVERY WITHIN A BROADBAND ACCESS NETWORK OF A TELECOMMUNICATIONS NETWORK

(71) Applicant: Deutsche Telekom AG, Bonn (DE)

(72) Inventors: Thomas Haag, Rodgau (DE);
Hans-Joerg Kolbe, Darmstadt (DE);
Wolfgang Hurst, Langen (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 17/422,454

(22) PCT Filed: Jan. 15, 2020

(86) PCT No.: PCT/EP2020/050934
§ 371 (c)(1),
(2) Date: Jul. 13, 2021

(87) PCT Pub. No.: WO2020/148346
PCT Pub. Date: Jul. 23, 2020

(65) Prior Publication Data
US 2022/0094594 A1    Mar. 24, 2022

(30) Foreign Application Priority Data

Jan. 15, 2019  (EP) ..................... 19151928

(51) Int. Cl.
*H04L 41/0806* (2022.01)
*H04L 12/28* (2006.01)
(Continued)

(52) U.S. Cl.
CPC ...... *H04L 41/0806* (2013.01); *H04L 12/2801* (2013.01); *H04L 12/2892* (2013.01);
(Continued)

(58) Field of Classification Search
CPC ............. H04L 41/0806; H04L 12/2801; H04L 12/2892; H04L 12/44; H04L 12/4625; H04L 41/20; H04L 41/5041
See application file for complete search history.

(56) References Cited

U.S. PATENT DOCUMENTS

| 2006/0031930 | A1 | 2/2006 | Patrick et al. | |
| 2012/0020668 | A1* | 1/2012 | Trojer | H04M 11/062 398/115 |
| 2015/0295728 | A1* | 10/2015 | Kadel | H04L 12/2874 370/235 |

FOREIGN PATENT DOCUMENTS

WO    WO 2018229059 A1    12/2018

* cited by examiner

*Primary Examiner* — Arvin Eskandarnia
*Assistant Examiner* — Chhian (Amy) Ling
(74) *Attorney, Agent, or Firm* — Leydig, Voit & Mayer, Ltd.

(57) ABSTRACT

A central office point of delivery within a broadband access network of a telecommunications network includes: access network facing nodes; and a control function and/or a switching fabric and/or service edge nodes. Execution of network attachment tasks and/or further functional or configuration tasks within the central office point of delivery involves using an execution state database as well as stateless execution service functionalities being assigned to different execution stages realized within the central office point of delivery, and a message bus connecting the different execution stages, wherein the execution stages comprise at least an access stage, a processing stage, and a device stage, wherein the execution service functionalities—in order to process or execute the network attachment tasks and/or further functional or configuration tasks—generate a plurality of messages on the message bus and consume a plurality of messages from the message bus.

11 Claims, 5 Drawing Sheets

(51) Int. Cl.
*H04L 12/44* (2006.01)
*H04L 41/5041* (2022.01)
*H04L 41/00* (2022.01)
*H04L 12/46* (2006.01)

(52) U.S. Cl.
CPC .......... *H04L 12/44* (2013.01); *H04L 12/4625* (2013.01); *H04L 41/20* (2013.01); *H04L 41/5041* (2013.01)

ns network and/or for the enhanced execution of network attachment tasks and/or further functional or configuration tasks within the central office point of delivery.

OPERATION AND ARCHITECTURE OF A CENTRAL OFFICE POINT OF DELIVERY WITHIN A BROADBAND ACCESS NETWORK OF A TELECOMMUNICATIONS NETWORK

CROSS-REFERENCE TO PRIOR APPLICATIONS

This application is a U.S. National Phase application under 35 U.S.C. § 371 of International Application No. PCT/EP2020/050934, filed on Jan. 15, 2020, and claims benefit to European Patent Application No. EP 19151928.9, filed on Jan. 15, 2019. The International Application was published in English on Jul. 23, 2020 as WO 2020/148346 A1 under PCT Article 21(2).

FIELD

The present invention relates a method for an improved and simplified operation and architecture of a central office point of delivery within a broadband access network of a telecommunications network and/or for the enhanced execution of network attachment tasks and/or further functional or configuration tasks within the central office point of delivery, wherein the central office point of delivery and/or the broadband access network typically comprises access network facing nodes as well as a control function and/or a switching fabric and/or service edge nodes, and wherein the execution of network attachment tasks and/or further functional or configuration tasks within the central office point of delivery involves using an execution state database as well as stateless execution service functionalities.

Furthermore, the present invention relates to a telecommunications network for an improved and simplified operation and architecture of a central office point of delivery within a broadband access network of the telecommunications network and/or for the enhanced execution of network attachment tasks and/or further functional or configuration tasks within the central office point of delivery, wherein the central office point of delivery and/or the broadband access network typically comprises access network facing nodes as well as a control function and/or a switching fabric and/or service edge nodes, and wherein the execution of network attachment tasks and/or further functional or configuration tasks within the central office point of delivery involves using an execution state database as well as stateless execution service functionalities.

Additionally, the present invention relates to a system for an improved and simplified operation and architecture of a central office point of delivery within a broadband access network of a telecommunications network and/or for the enhanced execution of network attachment tasks and/or further functional or configuration tasks within the central office point of delivery, the system comprising the telecommunications network with the broadband access network, wherein the central office point of delivery and/or the broadband access network typically comprises access network facing nodes as well as a control function and/or a switching fabric and/or service edge nodes, and wherein the execution of network attachment tasks and/or further functional or configuration tasks within the central office point of delivery involves using an execution state database as well as stateless execution service functionalities.

Furthermore, the present invention relates to a program comprising a computer readable program code, and to a computer-readable medium for an improved and simplified operation and architecture of a central office point of delivery within a broadband access network of a telecommunications network and/or for the enhanced execution of network attachment tasks and/or further functional or configuration tasks within the central office point of delivery.

BACKGROUND

The exchange of packetized information in broadband communication systems or telecommunications networks, both in fixed-line as in wireless communication systems (or fixed-line communication networks and mobile communication networks) has already grown dramatically and probably will also grow in the future due to the rapid spread of different data services in such communication networks.

The present disclosure generally relates to the area of access networks, especially aggregation networks, linking remote or central access nodes to a backbone network or core network of the telecommunications network, e.g. broadband access network platforms such as 5G or CORD (Central Office Re-architected as a Data Center). Typically, in such architectures, multiple network termination ports are aggregated by an access node (e.g. a DSLAM device (Digital Subscriber Line Access Multiplexer) or an OLT (Optical Line Terminal) device) and interconnected to a subscriber termination device via a layer-2 infrastructure such as a datacenter fabric. Presently, a user or subscriber of the telecommunications network typically needs to be connected to a service edge node (or service edge) such that connectivity can be provided to such user or subscriber.

In today's broadband networks, typically passive optical network (PON)-based networks, a key component of the central office point of delivery is the central access controller. In conventionally known networks or implementations of such a central office point of delivery, this component (central access controller) is covered in one software module that consists of a set of smaller modules that are directly connected, amongst each other using TCP/IP or UDP/IP sockets.

However, this typically means that both the communication between these sub-routines or modules as well as the sub-routines or modules themselves is stateful, and additionally, this results in a comparatively complex structure (and resulting in a comparatively complex implementation) of a central office point of delivery, and especially of such a controller instance.

SUMMARY

In an exemplary embodiment, the present invention provides a method for improved and simplified operation and architecture of a central office point of delivery within a broadband access network of a telecommunications network and/or for enhanced execution of network attachment tasks and/or further functional or configuration tasks within the central office point of delivery. The central office point of delivery and/or the broadband access network comprises access network facing nodes, and a control function and/or a switching fabric and/or service edge nodes. Execution of network attachment tasks and/or further functional or configuration tasks within the central office point of delivery involves using an execution state database as well as stateless execution service functionalities being assigned to different execution stages realized within the central office point of delivery, and a message bus connecting the different execution stages. The execution stages comprise at least an access stage, a processing stage, and a device stage, wherein the execution service functionalities—in order to process or execute the network attachment tasks and/or further functional or configuration tasks—generate a plurality of messages on the message bus and consume a plurality of messages from the message bus. The method comprises the following steps: in a first step, a trigger request regarding a network attachment task and/or further functional or configuration task is received by a first execution service functionality, the first execution service functionality being assigned to or being part of the access stage, wherein, as a reaction, the first execution service functionality generates at least a first message on the message bus; in a second step, the first message on the message bus is consumed by a second execution service functionality, the second execution service functionality being assigned to or being part of the processing stage, wherein, as a reaction, the second execution service functionality generates at least a second message on the message bus; and in a third step, the second message on the message bus is consumed by a third execution service functionality, the third execution service functionality being assigned to or being part of the device stage, wherein, as a reaction, the third execution service functionality configures the control function and/or the switching fabric and/or the access network facing nodes and/or the service edge nodes.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
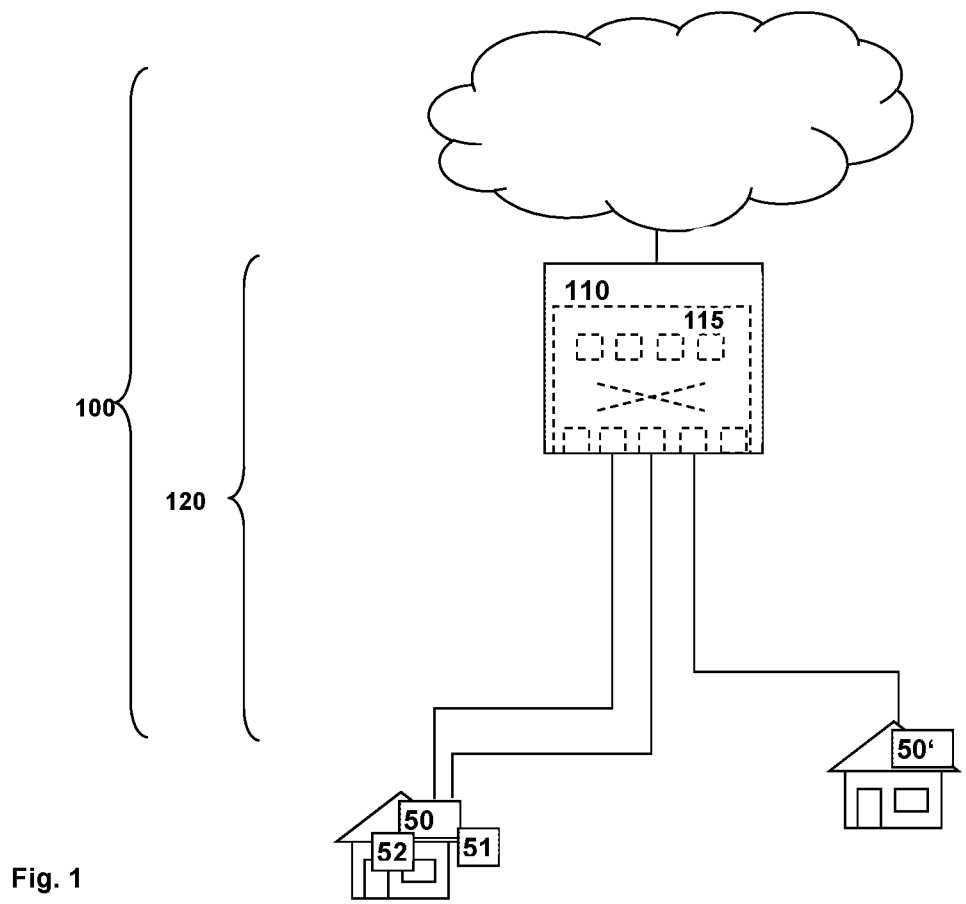
FIG. 1 schematically illustrates a telecommunications network according to the present invention, having a broadband access network with a central office point of delivery.

Exemplary embodiments of the present invention provide a technically simple and effective solution for an improved and simplified operation and architecture of a central office point of delivery within a broadband access network of a telecommunications network and/or for the enhanced execution of network attachment tasks and/or further functional or configuration tasks within the central office point of delivery. Exemplary embodiments of the present invention further provide a corresponding telecommunications network, and a corresponding system.

In an exemplary embodiment, the present invention provides a method for an improved and simplified operation and architecture of a central office point of delivery within a broadband access network of a telecommunications network and/or for the enhanced execution of network attachment tasks and/or further functional or configuration tasks within the central office point of delivery, wherein the central office point of delivery and/or the broadband access network comprises
  access network facing nodes,
   a control function and/or a switching fabric and/or service edge nodes,
wherein the execution of network attachment tasks and/or further functional or configuration tasks within the central office point of delivery involves using an execution state database as well as stateless execution service functionalities being assigned to different execution stages realized within the central office point of delivery, and a message bus connecting the different execution stages, wherein the execution stages comprise at least an access stage, a processing stage, and a device stage, wherein the execution service functionalities—in order to process or execute the different network attachment tasks and/or further functional or configuration tasks—generate a plurality of messages on the message bus and consume a plurality of messages from the message bus, wherein the method comprises the following steps:
  in a first step, a trigger request regarding the network attachment task and/or further functional or configuration task is received by a first execution service functionality, the first execution service functionality being assigned to or being part of the access stage, wherein, as a reaction, the first execution service functionality generates at least a first message on the message bus,
  in a second step, the first message on the message bus is consumed by a second execution service functionality, the second execution service functionality being assigned to or being part of the processing stage, wherein, as a reaction, the second execution service functionality generates at least a second message on the message bus,
  in a third step, the second message on the message bus is consumed by a third execution service functionality, the third execution service functionality being assigned to or being part of the device stage, wherein, as a reaction, the third execution service functionality configures the control function and/or the switching fabric and/or the access network facing nodes and/or the service edge nodes.

It is thereby advantageously possible according to the present invention to provide a solution to reduce the complexity of the conventionally used architecture of a central office point of delivery via avoiding the use of stateful components, or stages, and, especially via avoiding the use of stateful execution service functionalities.

According to the present invention, it is advantageously possible to avoid the use of stateful execution service functionalities via segregating functions from a bus communication between them. The segregated functions are stateless and use the bus communication. A stateful information is only maintained in a central data base that is also reachable in a preferred embodiment via the bus system.

This enables the use of micro services and provides the possibility to flexibly adding and removing functions in the system or in the central office point of delivery, and, hence, enhances the adaptability to new technologies or variants of the central office point of delivery.

Particularly according to the present invention, this architecture (also called service-based architecture or SBA) also comprises a certain mapping between functions and procedures: First, the execution of network attachment tasks and/or further functional or configuration tasks within the central office point of delivery involves using an execution state database as well as stateless execution service functionalities being assigned to different execution stages realized within the central office point of delivery, and a message bus connecting the different execution stages. Additionally, the execution stages comprise a certain predefined sequence of execution stages which is typically applied in order to process or execute the different network attachment tasks and/or further functional or configuration tasks. According to the present invention, at least an access stage, a processing stage, and a device stage is present but it is possible that the processing stage itself corresponds to a plurality of two or three or even more different processing stages. Due to the predefined sequence of execution stages, a functional split into different layers (or stages), using a message bus system, is possible according to the present invention, and allows the different execution service functionalities in the execution stages (or layers) to communicate while (and by) applying a pre-defined message flow order (especially realizing a uni-directional pre-defined order) that allows to avoid complex load balancing and message routing processes or message routing decisions.

According to the present invention, the execution service functionalities—in order to process or execute the different network attachment tasks and/or further functional or configuration tasks—generate a plurality of messages on the message bus and consume a plurality of messages from the message bus, wherein at least the following steps occur:
  in a first step, a trigger request regarding the network attachment task and/or further functional or configuration task is received by a first execution service functionality, the first execution service functionality being assigned to or being part of the access stage, wherein, as a reaction, the first execution service functionality generates at least a first message on the message bus,
  in a second step, the first message on the message bus is consumed by a second execution service functionality, the second execution service functionality being assigned to or being part of the processing stage, wherein, as a reaction, the second execution service functionality generates at least a second message on the message bus,
  in a third step, the second message on the message bus is consumed by a third execution service functionality, the third execution service functionality being assigned to or being part of the device stage, wherein, as a reaction, the third execution service functionality configures the control function and/or the switching fabric and/or the access network facing nodes and/or the service edge nodes.

The telecommunications network according to the present invention may be a fixed-line telecommunications network or a mobile communication network but preferably is a telecommunications network having both aspects (or parts) of a fixed-line telecommunications network (or being a fixed-line telecommunications network in such parts) and aspects (or parts) of a mobile communication network (or being a mobile communication network in such parts); such networks are also known under the term fixed-mobile-convergence networks (FMC networks).

According to a preferred embodiment of the present invention, the processing stage comprises a customer stage, a service stage, and a setup and configuration stage, the customer stage comprising a fourth execution service functionality, the service stage comprising a fifth execution service functionality, and the setup and configuration stage comprising a sixth execution service functionality, wherein the method comprises a fourth, a fifth, and a sixth step, wherein
  in the fourth step, the first message on the message bus is consumed by the fourth execution service functionality, wherein the fourth execution service functionality generates at least a fourth message on the message bus,
  in the fifth step, the fourth message on the message bus is consumed by the fifth execution service functionality, wherein the fifth execution service functionality generates at least a fifth message on the message bus, and
  in the sixth step, the fifth message on the message bus is consumed by the sixth execution service functionality, wherein the sixth execution service functionality generates at least the second message on the message bus to be consumed, in the third step, by the third execution service functionality.

Thereby, it is advantageously possible to comparatively easily realize a processing stage comprising a plurality of processing stages, such as, e.g., three processing stages.

Furthermore, it is advantageously possible and preferred according to the present invention that upon the reception by the first execution service functionality of the trigger request regarding the network attachment task and/or regarding the further functional or configuration task, and upon the generation of at least the first message, the implemented sequence of stages run through, even in case that a stage is not actively involved in processing messages related to a specific type of trigger request.

Thereby, it is advantageously possible to realize the predefined sequence of execution stages, i.e. the execution or the processing of the different network attachment tasks and/or further functional or configuration tasks via functionally splitting each one of the different network attachment tasks and/or further functional or configuration tasks into sub-tasks, these sub-tasks being assigned to the different stages (or layers), and applying a pre-defined message flow order (especially realizing a uni-directional pre-defined order from one stage to the next one) that allows to avoid complex load balancing and message routing processes or message routing decisions.

Furthermore, it is advantageously possible and preferred according to the present invention that the aim of a network attachment tasks is to prepare and configure the central office point of delivery and access network facing nodes in order to subsequently enable IP session setup, and wherein the aim of a further functional or configuration task is
  to process an external control plane request, especially a Radius request in view of or during an IP session setup, or a change of authorization request especially regarding an access network facing node of the broadband access network, and/or
  to send accounting data related to a user of the broadband access network or to a plurality of users.

Via the aim of the network attachment tasks being to prepare and configure the central office point of delivery and access network facing nodes in order to subsequently enable IP session setup (via these access network facing nodes), it is advantageously possible to execute further functional or configuration tasks (after having performed the network attachment task or tasks) in order to actually establish an IP connectivity for or via the respective access network facing nodes (and, hence, the users or customers being potentially connected using those access network facing nodes). Via the aim of the further functional or configuration task being to process an external control plane request (especially a Radius request in view of or during an IP session setup, or a change of authorization request especially regarding an access network facing node of the broadband access network) and/or to send accounting data related to a user of the broadband access network or related to a plurality of users, it is advantageously possible according to the present invention to use the same framework of stages (and the same framework of a predefined sequence of such stages) in different types of tasks to be performed in order for the central office point of delivery and its components being correctly configured.

For example, in order to configure a central office point of delivery according to the present invention, a plurality of different network attachment tasks and further functional or configuration tasks are performed, including processing Radius requests, accounting-related requests, change-of-authorization requests, performing (or defining) configurations involving access node control protocol tasks and the configuration of distribution point units (DPUs), especially distribution point units that are known to the telecommunications network or central office point of delivery.

Furthermore, it is advantageously possible and preferred according to the present invention that the switching fabric comprises a plurality of spine network nodes and a plurality of leaf network nodes, wherein especially at least part of the leaf network nodes realize one or a plurality of functionalities of one or a plurality of the service edge nodes.

Via using a switching fabric comprising spine network nodes and leaf network nodes, it is efficiently possible to efficiently route traffic, both traffic only within the central office point of delivery as well as traffic outside of the central office point of delivery.

Furthermore, it is advantageously possible and preferred according to the present invention that the first message comprises all necessary pieces of information for the processing stage or for the customer stage, and/or wherein the second message comprises all necessary pieces of information for the device stage, and/or wherein the fourth message comprises all necessary pieces of information for the service stage, and/or wherein the fifth message comprises all necessary pieces of information for the setup and configuration stage.

It is thereby advantageously possible to implement the execution of the network attachment tasks and/or of the further functional or configuration tasks in an efficient manner and via realizing the predefined sequence of execution stages. Due to the predefined sequence of execution stages, a functional split of the network attachment tasks and/or of the further functional or configuration tasks into sub-tasks (to be performed by the different execution stages) is advantageously possible. The realization of the predefined (linear or uni-directional) sequence of execution stages (i.e. the processing of the network attachment tasks and/or of the further functional or configuration tasks in a predefined manner using (or, at least formally, "traversing") all predefined execution stages even though, at one point or the other, regarding a specific network attachment and/or further functional or configuration task, there may be an execution stage that does not actively participate or that is not specifically required to actively perform a specific sub-task to operationally participate in performing the specific network attachment and/or further functional or configuration task) is helped by the corresponding preceding messages comprising all necessary pieces of information for the processing of the subsequent processing stage. According to the present invention, at least an access stage, a processing stage, and a device stage is present, but other combinations of execution stages are possible, especially it is possible that the processing stage corresponds to a plurality of two or three (or even more) different processing stages.

Furthermore, it is preferred that the messages are transmitted or generated, on the message bus, as part of an array of messages or as part of a transaction of messages, wherein, on the message bus, a message storm event is detected in case that a number of corresponding messages—these corresponding messages being generated due to the same kind of causes is comparatively strongly increasing per time interval.

It is thereby advantageously possible to prevent malfunction of the central office point of delivery and its components, and especially of the execution state database as well as the message bus, especially caused by a message storm on the message bus.

It is preferred according to the present invention that the trigger request regarding a network attachment task corresponds to a port-up message, especially regarding an access network facing node, which is received by a corresponding first execution service functionality of the access stage, wherein the first execution service functionality generates generic data from the port-up message and generates at least the first message on the message bus, wherein the first message is consumed by the fourth execution service functionality of the customer stage, wherein the fourth execution service functionality determines the user or customer and generates at least the fourth message comprising all available customer data of a customer database, wherein the fourth message is consumed by the fifth execution service functionality of the service stage, wherein the fifth execution service functionality generates at least the fifth message, wherein the fifth message is consumed by the sixth execution service functionality of the setup and configuration stage, wherein the sixth execution service functionality generates at least the second message comprising a service edge information, wherein the second message is consumed by the third execution service functionality of the device stage corresponding to configuring the access network facing nodes.

Thereby, it is advantageously possible to efficiently and comparatively easily perform a network attachment task.

According to a further preferred embodiment of the present invention, a trigger request regarding a radius request or regarding accounting data or regarding a change-of-authorization event is received by a first execution service functionality of the access stage, corresponding to a service edge, wherein the first execution service functionality generates generic data regarding the trigger request and generates at least the first message on the message bus, wherein the first message is consumed by the fourth execution service functionality of the customer stage, wherein the fourth execution service functionality determines the user or customer and generates at least the fourth message comprising all available customer data of a customer database, wherein the fourth message is consumed by the fifth execution service functionality of the service stage, wherein the fifth execution service functionality generates at least the fifth message comprising a number parameters, wherein the fifth message is consumed by the sixth execution service functionality of the setup and configuration stage, wherein the sixth execution service functionality generates at least the second message comprising a request to send a response corresponding to the trigger request, especially a radius response corresponding to the radius request, wherein the second message is consumed by the third execution service functionality of the device stage corresponding to sending a response corresponding to the trigger request, especially a radius response.

It is thereby advantageously possible to easily and effectively realize an exemplary embodiment of the inventive method of an improved and simplified operation and architecture of a central office point of delivery.

Furthermore, the present invention relates to a telecommunications network for an improved and simplified operation and architecture of a central office point of delivery within a broadband access network of a telecommunications network and/or for the enhanced execution of network attachment tasks and/or further functional or configuration tasks within the central office point of delivery, wherein the central office point of delivery and/or the broadband access network comprises access network facing nodes,
    a control function and/or a switching fabric and/or service edge nodes, wherein the execution of network attachment tasks and/or further functional or configuration tasks within the central office point of delivery involves using an execution state database as well as stateless execution service functionalities being assigned to different execution stages realized within the central office point of delivery, and a message bus connecting the different execution stages, wherein the execution stages comprise at least an access stage, a processing stage, and a device stage, wherein the execution service functionalities—in order to process or execute the different network attachment tasks and/or further functional or configuration tasks—generate a plurality of messages on the message bus and consume a plurality of messages from the message bus, wherein the telecommunications network is configured such that:

a trigger request regarding the network attachment task and/or further functional or configuration task is received by a first execution service functionality, the first execution service functionality being assigned to or being part of the access stage, wherein, as a reaction, the first execution service functionality generates at least a first message on the message bus, the first message on the message bus is consumed by a second execution service functionality, the second execution service functionality being assigned to or being part of the processing stage, wherein, as a reaction, the second execution service functionality generates at least a second message on the message bus, the second message on the message bus is consumed by a third execution service functionality, the third execution service functionality being assigned to or being part of the device stage, wherein, as a reaction, the third execution service functionality configures the control function and/or the switching fabric and/or the access network facing nodes and/or the service edge nodes.

Furthermore, the present invention relates to a system for an improved and simplified operation and architecture of a central office point of delivery within a broadband access network of a telecommunications network and/or for the enhanced execution of network attachment tasks and/or further functional or configuration tasks within the central office point of delivery, wherein the central office point of delivery and/or the broadband access network comprises access network facing nodes,
    a control function and/or a switching fabric and/or service edge nodes, wherein the execution of network attachment tasks and/or further functional or configuration tasks within the central office point of delivery involves using an execution state database as well as stateless execution service functionalities being assigned to different execution stages realized within the central office point of delivery, and a message bus connecting the different execution stages, wherein the execution stages comprise at least an access stage, a processing stage, and a device stage, wherein the execution service functionalities—in order to process or execute the different network attachment tasks and/or further functional or configuration tasks—generate a plurality of messages on the message bus and consume a plurality of messages from the message bus, wherein the system is configured such that:

a trigger request regarding the network attachment task and/or further functional or configuration task is received by a first execution service functionality, the first execution service functionality being assigned to or being part of the access stage, wherein, as a reaction, the first execution service functionality generates at least a first message on the message bus, the first message on the message bus is consumed by a second execution service functionality, the second execution service functionality being assigned to or being part of the processing stage, wherein, as a reaction, the second execution service functionality generates at least a second message on the message bus, the second message on the message bus is consumed by a third execution service functionality, the third execution service functionality being assigned to or being part of the device stage, wherein, as a reaction, the third execution service functionality configures the control function and/or the switching fabric and/or the access network facing nodes and/or the service edge nodes.

Still additionally, the present invention relates to a program comprising a computer readable program code which, when executed on a computer and/or on a central office point of delivery, causes the computer and/or the central office point of delivery to perform an exemplary embodiment of the inventive method.

Furthermore, the present invention relates to a computer-readable medium for an improved and simplified operation and architecture of a central office point of delivery within a broadband access network of a telecommunications network and/or for the enhanced execution of network attachment tasks and/or further functional or configuration tasks within the central office point of delivery, the computer-readable medium comprising instructions which when executed on a computer or on a central office point of delivery, causes the computer and/or the central office point of delivery to perform an exemplary embodiment of the inventive method.

These and other characteristics, features and advantages of the present invention will become apparent from the following detailed description, taken in conjunction with the accompanying drawings, which illustrate, by way of example, principles of the invention. The description is given for the sake of example only, without limiting the scope of the invention. The reference figures quoted below refer to the attached drawings.

The present invention will be described with respect to particular embodiments and with reference to certain drawings, but the invention is not limited thereto. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order; this is especially the case for the terms "first step", "second step", etc. It is to be understood that the terms so used are interchangeable under appropriate circumstances and that the embodiments of the invention described herein are capable of operation in other sequences than described or illustrated herein.

In FIG. 1, a telecommunications network 100 according to the present invention is schematically shown, having preferably at least a fixed line part. A mobile (or cellular) part may be present as well, as part of the telecommunications network 100. User equipment or client devices 51, 52 are connected to the telecommunications network 100 via a (broadband) access network 120. The telecommunications network 100 comprises, especially as part of the broadband access network 120, at least one logical or physical central office point of delivery 110 that is preferably realized within a data center and that is especially handling different access requirements, especially different access possibilities, of the client devices 51, 52 to network functionalities provided by the telecommunications network 100 or via the telecommunications network 100. The client devices 51, 52 are typically connected to the logical or physical central office point of delivery 110 via a customer premises equipment device 50, 50' or via a customer premises equipment functionality that may be built in the client devices 51, 52. Preferably but not necessarily, the central office point of delivery 110 comprises a switching fabric 115 comprising a plurality of spine network nodes and typically also a plurality of leaf network nodes which are not explicitly represented in FIG. 1.

Figure 2:
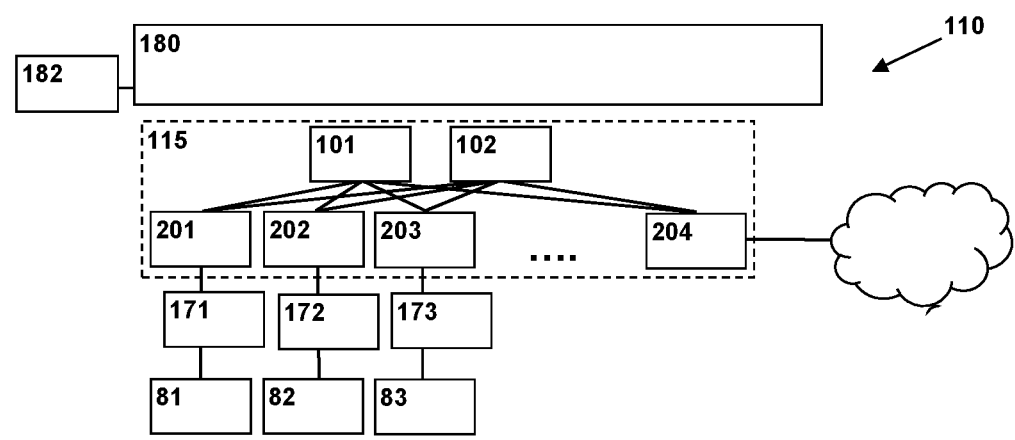
FIG. 2 schematically illustrates a part of a broadband access network of an exemplary embodiment of an inventive telecommunications network with a central office point of delivery, the central office point of delivery comprising a control function and, exemplarily, a switching fabric comprising a plurality of spine network nodes and typically also a plurality of leaf network nodes, and a plurality of service edge nodes.

FIG. 2 schematically illustrates a central office point of delivery 110 as part of a broadband access network 120 of a telecommunications network 100, wherein the represented part of the telecommunications network 100 comprises—besides a control function 180 and at least one repository node 182—a switching fabric 115 comprising a plurality of spine network nodes 101, 102 and typically also a plurality of leaf network nodes 201, 202, 203, 204, as well as a plurality of service edge nodes 171, 172, 173 and a plurality of access network facing nodes 81, 82, 83. Examples of such access network facing nodes 81, 82, 83 include line termination nodes and/or network termination nodes.

Typically, each of the line termination nodes has one or a plurality of access node ports. The line termination nodes may be provided to support different access technologies to a home gateway or customer premises equipment 50. In the exemplary embodiment shown in FIG. 2, the first access network facing node 81 may be taken as a line termination node supporting to be connected to an optical network, especially a passive optical network (PON), typically a so-called optical line terminal (OLT) or optical line terminal device. In such a situation, a client device 51 is connected to the telecommunications network 100 (i.e. to the first access network facing node 81) via the customer premises equipment 50 (or home gateway device 50, cf. FIG. 1), and, if applicable, a network termination node. The functionality of the customer premises equipment 50 (or home gateway device 50, cf. FIG. 1) and the functionality of the network termination node may also be integrated in one device or "box". Even the functionality of the client device 51, the functionality of the customer premises equipment 50 (or home gateway device 50) and the functionality of the network termination node 75 may be integrated in one device or "box".

In case of the access network facing nodes 81, 82, 83 having a plurality of access node ports, a plurality of network termination nodes are able to be connected to one of such access network facing nodes 81, 82, 83 and/or (in case that an access network facing node 81, 82, 83 has a plurality of ports) also a plurality of customer premises equipments are able to be connected to one access network facing node 81, 82, 83.

According to the present invention, a method for an improved and simplified operation and architecture of a central office point of delivery 110 (within a broadband access network 120 of a telecommunications network 100) is provided, the method being especially provided for more efficiently processing or executing network attachment tasks and/or further functional or configuration tasks within the central office point of delivery. The execution of such network attachment tasks and/or such further functional or configuration tasks involves using an execution state database 250 as well as stateless execution service functionalities being assigned to different execution stages realized within the central office point of delivery 110, and a message bus 290 connecting the different execution stages (represented in FIGS. 3 and 4 for a specific exemplary implementation), wherein the execution stages comprise at least an access stage 281, a processing stage 282, and a device stage 283. In order to process or execute the different network attachment tasks and/or further functional or configuration tasks, the execution service functionalities generate a plurality of messages on the message bus 290 and consume a plurality of messages from the message bus 290. For executing a specific network attachment task and/or a specific further functional or configuration task, the method according to the present invention comprises at least the following steps:

in a first step, a trigger request regarding the specific network attachment task and/or specific further functional or configuration task is received by a first execution service functionality, the first execution service functionality being assigned to or being part of the access stage 281, wherein, as a reaction, the first execution service functionality generates at least a first message on the message bus 290, in a second step, the first message on the message bus 290 is consumed by a second execution service functionality, the second execution service functionality being assigned to or being part of the processing stage 282, wherein, as a reaction, the second execution service functionality generates at least a second message on the message bus 290, in a third step, the second message on the message bus 290 is consumed by a third execution service functionality, the third execution service functionality being assigned to or being part of the device stage 283, wherein, as a reaction, the third execution service functionality configures the control function 180 and/or the switching fabric 115 and/or the access network facing nodes 81, 82, 83 and/or the service edge nodes 171, 172, 173.

Figure 3:
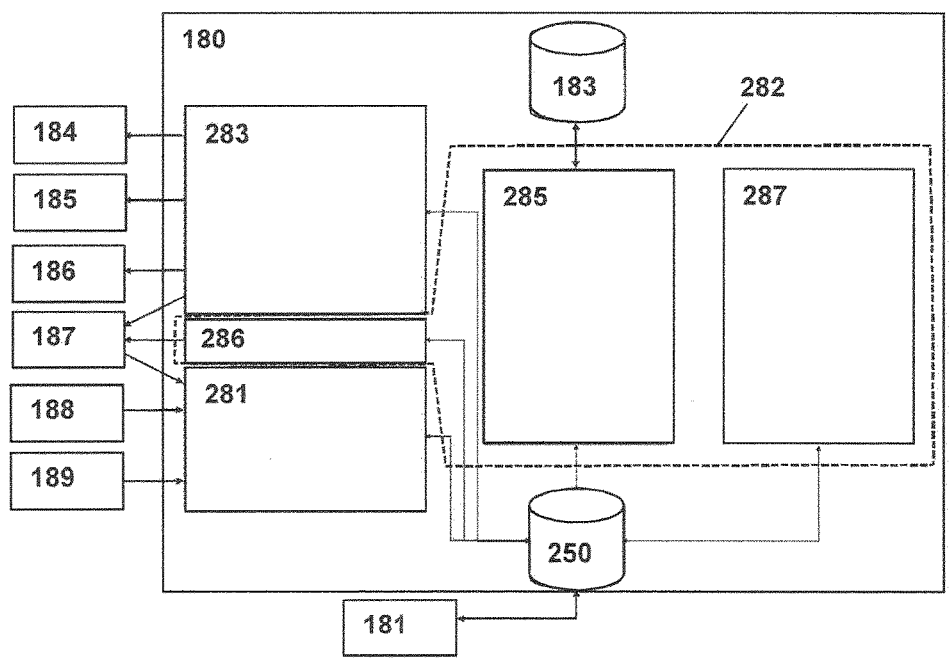
FIG. 3 schematically illustrates an exemplary configuration and/or topology of a control function of a central office point of delivery with connected components, exemplarily representing different execution stages according to the present invention.

In FIG. 3, an exemplary configuration and/or topology of a control function 180 of a central office point of delivery 110 with connected components is schematically shown. The control function 180 comprises a central customer database 183, and an EMS 181 (element management system) for monitoring and status. In FIG. 3, the control function 180 is shown to be linked or connected to a number of entities or units external to the control function 180, namely

- an access device driver unit or entity 184,
- a BNG (broadband network gateway) control plane unit or entity 185,
- a fabric controller unit or entity 186,
- an AAA (authentication, authorization, and accounting)/policy control unit or entity 187,
- a DPU/MSAN access network control protocol unit or entity 188, and
- a further access device driver unit or entity 189.

Additionally, the control function 180 comprises the execution state database 250 as well as a number of execution stages. In this example of an implementation of the present invention, instead of using only three execution stages (an access stage 281, a processing stage 282, and a device stage 283), five execution stages are used, namely—besides the access stage 281 and the device stage 283, and, in a way, replacing (or instead of) the processing stage 282—a customer stage 285, a service stage 286, and a setup and configuration stage 287.

Figure 4:
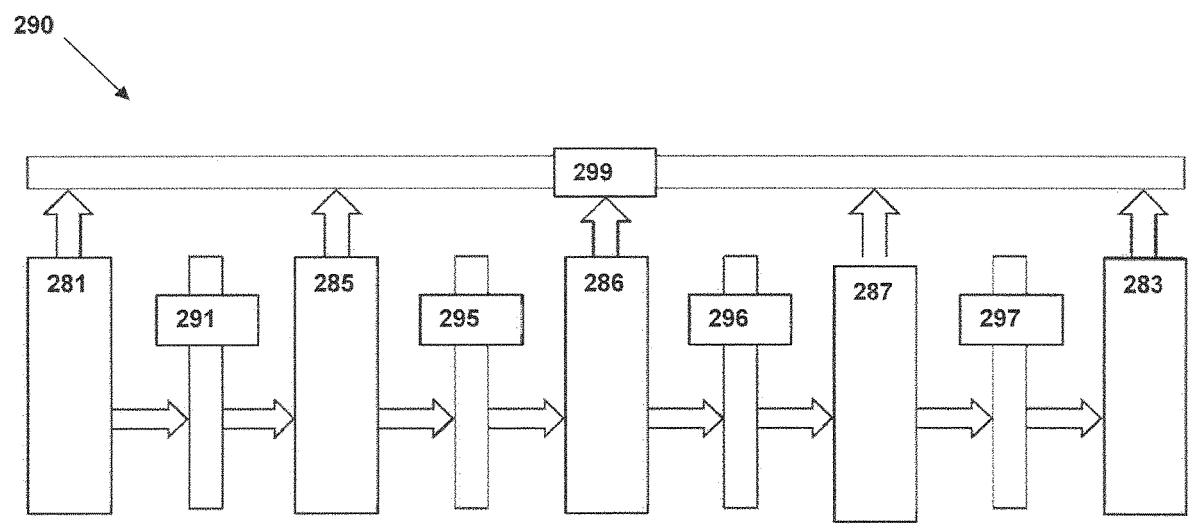
FIG. 4 schematically illustrates an exemplary configuration of a message bus provided for the communication between the execution stages, and between the execution stages and the execution stage database.

FIG. 4 schematically illustrates an exemplary configuration of a message bus 290 provided for the communication between the same execution stages 281, 285, 286, 287, 283 as shown in FIG. 3, and between the execution stages 281, 285, 286, 287, 283 and the execution stage database 250. The message bus 290 is either sub-divided into different parts or topics of the message bus 290, or, alternatively, the message bus 290 comprises a plurality of individual message busses, such individual message buses being also called topics of the message bus 290. It is preferred according to the present invention that one part or topic of the message bus 290 is related to or responsible for only one protocol version; the version number is especially added to the name of the respective topic, for example: "PON_PORT_UP_v1". Especially, there is one topic of the message bus 290 for each message type and/or each connection between execution service functionalities and/or between execution stages, such as, a first topic 291 of the message bus 290 between the access stage 281 and the customer stage 285, a second topic 295 of the message bus 290 between the customer stage 285 and the service stage 286, a third topic 296 of the message bus 290 between the service stage 286 and the configuration stage 287, a fourth topic 297 of the message bus 290 between the configuration stage 287 and the device stage 283, and a fifth topic 299 of the message bus 290 between the access stage 281, the customer stage 285, the service stage 286, the configuration stage 287, and the device stage 283, on the one hand, and the execution stage database 250, on the other hand. The direction of the arrows shown in FIG. 4 represent a direction of the processing of the network attachment tasks and/or of further functional or configuration tasks via using the execution stages and the associated execution service functionalities, respectively. Via the topics, the progression—among the different stages—of the processing of different tasks is implemented.

FIGS. 5 to 9 schematically illustrate exemplary embodiments or implementations of the different execution stages shown in FIG. 4.

Figure 5:
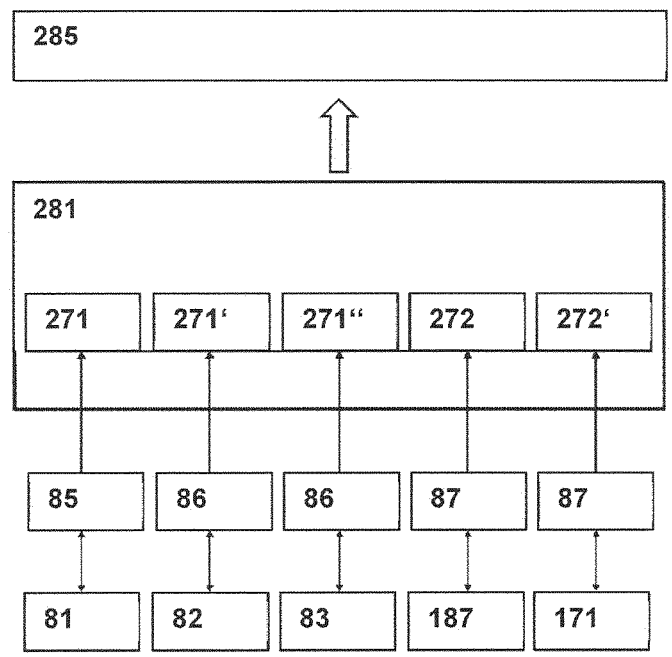
FIGS. 5 to 9 schematically illustrate exemplary embodiments or implementations of the different execution stages shown in FIG. 4.

FIG. 5 shows the access stage 281 in more detail (and its connection to the downstream customer stage 285). The access stage 281 comprises different execution service functionalities 271, 271', 271", 272, 272'. These execution service functionalities translate the communication of the access hardware, respectively, towards a single or unified message format of messages (corresponding to the first message on the message bus 290) consumed by the customer stage 285. Different kinds of execution service functionalities are used for different access technologies, e.g.: a first access network facing node 81, using PON technology (passive optical network technology), is linked via a VOLTA node or entity 85 to a first kind 271 of the first execution service functionality; a second access network facing node 82, related to using DPU technology (distribution point unit), is linked via an ANCP (access node control protocol) node or entity 86 to a second kind 271' of the first execution service functionality; a third access network facing node 83, related to using MSAN technology (multi-service access node), is linked via an ANCP (access node control protocol) node or entity 86 to a third kind 271" of the first execution service functionality; the AAA (authentication, authorization, and accounting)/policy control unit or entity 187 is linked via a radius node or entity 87 to a fourth kind 272 of the first execution service functionality; and a service edge 171 is linked via a radius node or entity 87 to a fifth kind 272' of the first execution service functionality.

The access stage 281 does typically not have information regarding which client or customer is concerned; the access stage 281 does transmit hardware-related events in a common format to the customer stage 285.

Figure 6:
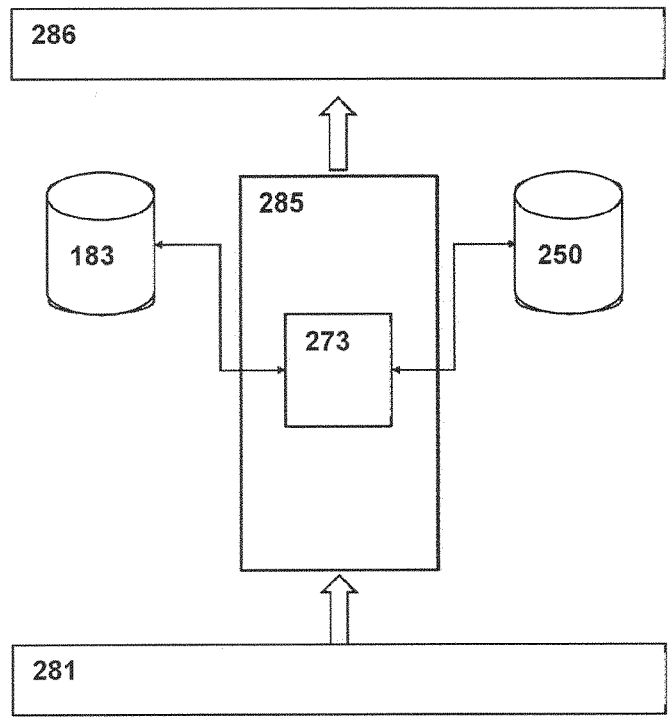

FIG. 6 shows the customer stage 285 in more detail (and its connection to both the downstream service stage 286, and the upstream access stage 281). The customer stage 285 comprises a fourth execution service functionality 273. This fourth execution service functionality 273 has the task to determine the customer or client from the information provided by the access stage 281. Thereby, all available data (or data sources) are queried or forwarded, e.g., in case of using the ANCP (access node control protocol), a line ID information is provided by the access stage 281, in case of a situation using PON, the line ID has to be queried, e.g. via using a serial number or in another manner. Examples of different pieces of information provided by the access stage 281 include the following pieces of hardware-related information:

LineID RegistrationID, Serial Number, AeA (Access Endpoint Address), LAT-ID (Logical Access Termination ID), CNO (Central Office Network), ANO (Access Network Operator), VSP (Virtual Service Provider), Termination Type, Name, Option; and the following pieces of customer and/or service related information:

Customer Identification, Service Identification, PPP Username, Accounting Session ID.

In case that all pieces of information are gathered, these are transmitted in a single or unified message format of messages (corresponding to the fourth message on the message bus 290), consumed by the service stage 286.

Figure 7:
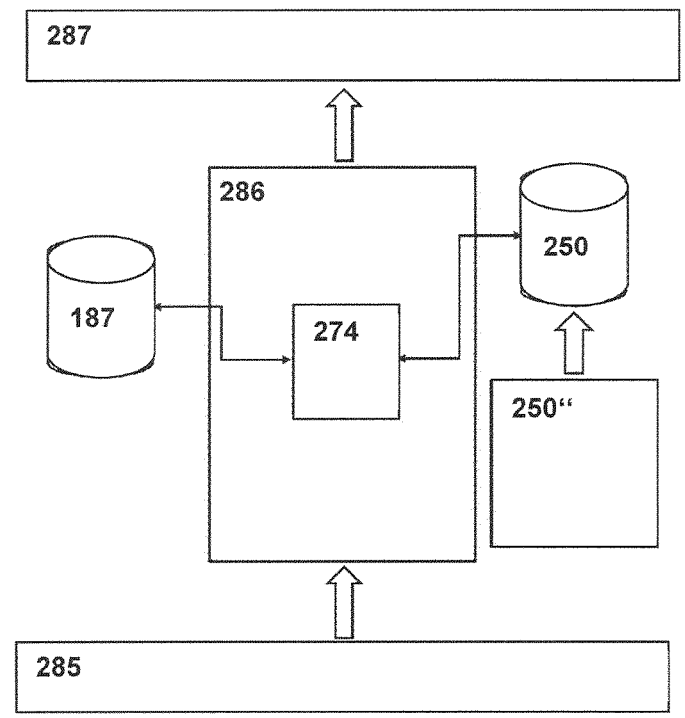

FIG. 7 shows the service stage 286 in more detail (and its connection to both the downstream configuration stage 287, and the upstream customer stage 285). The service stage 286 comprises a fifth execution service functionality 274. This fifth execution service functionality 274 has the task to perform or execute a request to the AAA (authentication, authorization, and accounting)/policy control unit or entity 187 and/or to determine special services; this is typically only necessary in case that the concerned access or access node (or the related product) is not based on a radius authentication request, i.e. PPPoE (point-to-point-protocol over Ethernet); this could, e.g., be A10-NSP products; it is decided based on the pieces of information provided by the customer stage 285. Examples of different pieces of information provided by the customer stage 285 include the following pieces of customer and/or service related information:
Customer Identification, Service Identification, PPP Username, Accounting Session ID.
In case that all pieces of information are gathered, these are transmitted in a single or unified message format of messages (corresponding to the fifth message on the message bus 290), consumed by the configuration stage 287.

Figure 8:
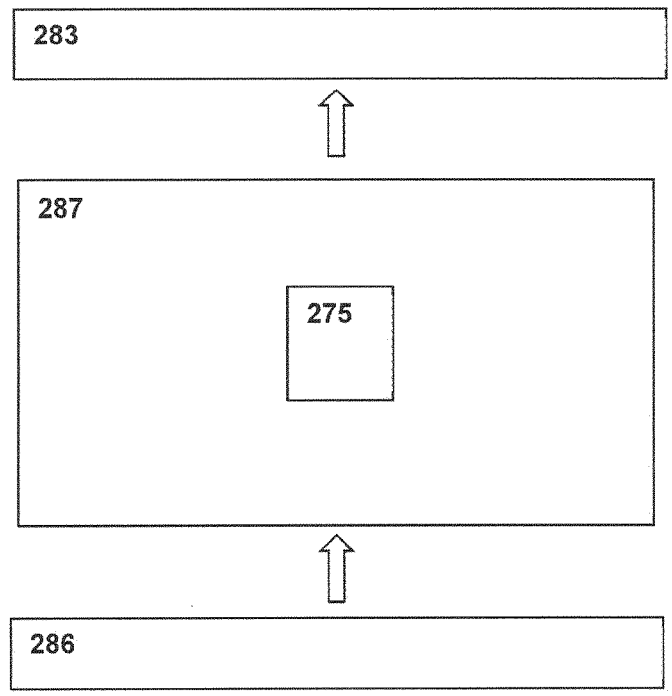

FIG. 8 shows the configuration stage 287 in more detail (and its connection to both the downstream device stage 283, and the upstream service stage 286). The configuration stage 287 comprises a sixth execution service functionality 275. This sixth execution service functionality 275 has the task decide as to how configuration of the central office point of delivery 110 has to be changed (or adapted) in order to execute the specific network attachment task and/or the specific further functional or configuration task. This does not only include the configuration of the switching fabric 115, but also the outer VLAN (virtual local area network), the quality-of-service (QoS), the ACL, etc. It is preferred according to the present invention that the configuration stage 287 is provided with all pieces of information regarding a specific client or customer such that no database connection is required to be used by the sixth execution service functionality 275. Thereby, the configuration tasks are defined to be executed by the device stage 283. In case that all such configuration tasks are defined, these are transmitted in a single or unified message format of messages (corresponding to the second message on the message bus 290), consumed by the device stage 283.

Figure 9:
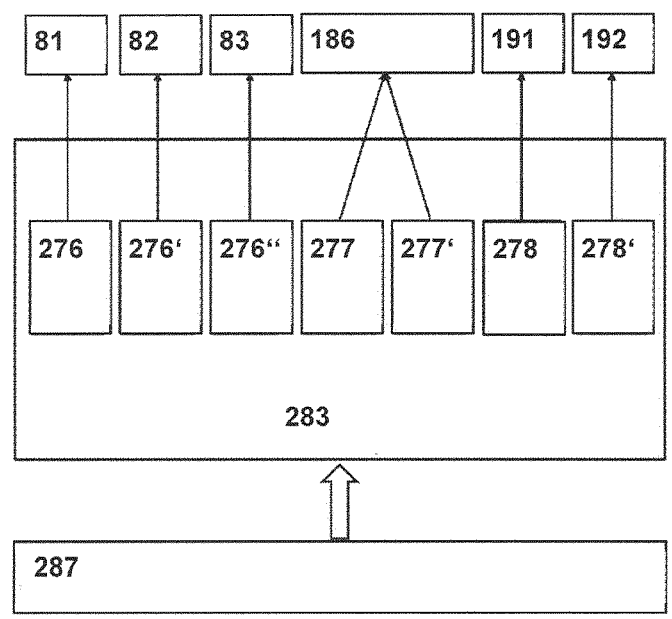

FIG. 9 shows the device stage 283 in more detail (and its connection to the upstream customer stage 287). The device stage 283 comprises different execution service functionalities 276, 276', 276", 277, 277', 278, 278'. These execution service functionalities translate and communicate the respective commands from the configuration stage 287 to the respective hardware devices; the specific kind of this translation or communication is typically dependent on the respective hardware component. The device stage 283 receives this command information in a single or unified message format of messages, and this is transmitted in order to configure the respective hardware devices, i.e. the control function 180 and/or the switching fabric 115 and/or the access network facing nodes 81, 82, 83 and/or the service edge nodes 171, 172, 173. Different kinds of execution service functionalities are used for different hardware devices, e.g.: a first kind 276 of the third execution service functionality is linked or corresponds to the first access network facing node 81, using PON technology (passive optical network technology); a second kind 276' of the third execution service functionality is linked to the second access network facing node 82, related to using DPU technology (distribution point unit); a third kind 276" of the third execution service functionality is linked to a third access network facing node 83, related to using MSAN technology (multi-service access node); a fourth kind 277 and a fifth kind 277' of the third execution service functionality is linked to the fabric controller unit or entity 186; a sixth kind 278 of the third execution service functionality is linked to a REST and/or radius unit or entity 191, and a seventh kind 278' of the third execution service functionality is linked to a radius unit or entity 192.

According to the present invention, regarding the execution service functionalities, at least part or all of the following requirements are typically fulfilled:
the execution service functionalities log all of their activities to a logging topic (not represented in the figures) of the message bus 290;
an execution service functionality needs to provide all pieces of information (typically from various databases) for the next stage via a message put on the message bus 290 (thereby, it is advantageously possible to avoid that a later execution stage needs to retrieve the same pieces of information repeatedly);
in case that an execution service functionality receives an invalid message, it has to transmit or signal this event, however, the execution service functionality does not care for solving such a problem;
two execution service functionalities are independent in the sense that the status of one of these execution service functionality is irrelevant for the other execution service functionality; a message is put to the message bus 290 by an execution service functionality, but neither the reception of this message nor its correct processing is monitored by the sending execution service functionality.

According to the present invention, regarding the format of the messages of the message bus 290, at least part or all of the following requirements are typically fulfilled:
a message on the message bus 290 is always a single message, having a special purpose;
a transaction or message container is a combination of a plurality of messages (or a packet of messages) on the message bus 290;
the format of messages on the message bus 290 is to be defined uniformly and globally; typically the message format is JSON;
each execution service functionality has to ignore attributes, keys and/or values that it does not know;
basically, each message is to be sent in an array (or a message container), thereby providing the possibility to send hundreds of messages in one message container;
the message bus 290 is divided into different topics, and a topic exists for each message type and/or for each communication link between execution service functionalities; per topic, there may be a plurality of producer (execution service functionalities) as well as a plurality of consumer (execution service functionalities)
a message that is consumed does not stay in the message bus 290.

In the following, different embodiments or specific scenarios are described in more detail. In the context of the present invention, in all these scenarios, the concept of a plurality of different execution stages is used:
First Scenario—Fiber to the Home—ONT (Optical Network Terminal) Power on
In a first processing step, the optical network terminal is powered on, and at some point in time, VOLTHA (Virtual OLT hardware abstraction) transmits a port up message;
In a second processing step, the access stage 281 receives the port up message as a trigger request regarding the network attachment task and/or regarding the further functional or configuration task and converts pieces of information received from the PON into a generic format; inter alia, there is a message type is generated which receives the value "port up";

In a third processing step, the customer stage 285, aims to determine the customer or client and to retrieve all available data from an appropriate database; in case of a "fiber to the home"-scenario, the registration ID or a serial number is typically the key to determine the customer or client; in any case, at least one line ID typically needs to be found or determined;

In a fourth processing step, the service stage 286 may be required to execute a pre-authentication towards the AAA/policy control unit or entity 187;

In a fifth processing step, the configuration stage 287 verifies which configuration to provide and prepare; e.g. it configures the outer VLAN and the activation of the service edge 171;

In a sixth processing step, the device stage 283 receives a command information from the configuration stage 287, and configures the devices, i.e. executes the command information.

Second Scenario—Fiber to the Building—DPU (Distribution Point Unit) Power on

In a first processing step, the optical network terminal is powered on, and at some point in time, VOLTHA (Virtual OLT hardware abstraction) transmits a port up message;

In a second processing step, the access stage 281 receives the port up message as a trigger request regarding the network attachment task and/or regarding the further functional or configuration task and converts pieces of information received from the PON into a generic format; inter alia, there is a message type is generated which receives the value "port up";

In a third processing step, the customer stage 285, aims to determine the customer or client and to retrieve all available data from an appropriate database; in case of a "fiber to the building"-scenario, the corresponding DPU is identified via a serial number; this does not necessarily identify a client or customer, but the message of the customer stage 285 comprises the DPS information;

In a fourth processing step, the service stage 286 is idle in this scenario;

In a fifth processing step, the configuration stage 287 verifies which configuration to provide and prepare; in the "fiber to the building"-scenario, a DPU is detected, and the configuration stage 287 prepares the command information to configure the MOSAIC VLAN and the ANCP VLAN; additionally, VOLTHA is configured;

In a sixth processing step, the device stage 283 receives a command information from the configuration stage 287, and configures the devices, i.e. executes the command information.

Third Scenario—Fiber to the Building—Customer (Retail) Power on

In a first processing step, the customer premises equipment is powered on, and the DPU transmits a port up message via ANCP;

In a second processing step, the access stage 281 receives the ANCP port up message and converts the ANCP data into a generic format; inter alia, there is a message type is generated which receives the value "port up";

In a third processing step, the customer stage 285, aims to determine the customer or client and to retrieve all available data from an appropriate database; in case of a "fiber to the building"-scenario, the line ID information (being part of the ANCP port up message) identifies a client or customer;

In a fourth processing step, the service stage 286 may be required to execute a pre-authentication towards the AAA/policy control unit or entity 187;

In a fifth processing step, the configuration stage 287 verifies which configuration to provide and prepare; in the "fiber to the building"-scenario, a customer or client at a DPU is detected, and the configuration stage 287 prepares the command information to configure the service edge 171 in order to receive the VLAN such that PPPoE is possible to use;

In a sixth processing step, the device stage 283 receives a command information from the configuration stage 287, and configures the devices, i.e. executes the command information.

Fourth Scenario—Radius Authentication from a Service Edge Node

In a first processing step, the service edge node 171 receives a PPPoE and sends a radius request to the service edge handler;

In a second processing step, the access stage 281 receives the radius request and converts the radius data into a generic format;

In a third processing step, the customer stage 285, aims to determine the customer or client and to retrieve all available data from an appropriate database; in case of a "radius authentication from a service edge node"-scenario, either username and password, or in case that a line ID information is already available in PPPoE the line ID information is used; this customer stage 285, the client is not authenticated only the relevant pieces of information are retrieved and forwarded;

In a fourth processing step, the service stage 286 executes a radius request towards the AAA/policy control unit or entity 187, and the AAA/policy control unit or entity 187 returns a number of pieces of information which are provided to the configuration stage 287;

In a fifth processing step, the configuration stage 287 verifies which configuration to provide and prepare; in the "radius authentication from a service edge node"-scenario, it requests the device stage to answer the radius request;

In a sixth processing step, the device stage 283 receives a command information from the configuration stage 287, and send the radius response to the service edge node 171.

Fifth Scenario—Radius Accounting Request from a Service Edge Node

In a first processing step, the service edge node 171 sends accounting data regarding a specific session and sends it to the service edge handler;

In a second processing step, the access stage 281 receives the accounting request and converts the radius data into a generic format;

In a third processing step, the customer stage 285, aims to determine the customer or client and to retrieve all available data from an appropriate database; in case of a "radius accounting request from a service edge node"-scenario, the accounting session ID would be the information to retrieve all other pieces of information;

In a fourth processing step, the service stage 286 is idle in this scenario;

In a fifth processing step, the configuration stage 287 verifies which configuration to provide and prepare; in the "radius accounting request from a service edge node"-scenario, it requests the device stage 283 to forward the accounting data; alternatively, checks regarding used volume could occur here;

In a sixth processing step, the device stage 283 receives a command information from the configuration stage 287, and sends the accounting data to the AAA/policy control unit or entity 187.

Sixth Scenario—Change of Authentication from the AAA/Policy Control Unit or Entity In a first processing step, the AAA/policy control unit or entity 187 sends a change of authentication regarding a specific session and sends it to the change of authentication handler;

In a second processing step, the access stage 281 receives the request and converts the data into a generic format;

In a third processing step, the customer stage 285, aims to determine the customer or client and to retrieve all available data from an appropriate database; in case of a "change of Authentication from the AAA/policy control unit or entity"-scenario, the accounting session ID would be the information to retrieve all other pieces of information;

In a fourth processing step, the service stage 286 is idle in this scenario;

In a fifth processing step, the configuration stage 287 verifies which configuration to provide and prepare; in the "change of Authentication from the AAA/policy control unit or entity"-scenario, it could be changes to quality of service, ACL (Access Control/Filtering Rules) or other services;

In a sixth processing step, the device stage 283 receives a command information from the configuration stage 287, and sends the respective data.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operation of a central office point of delivery within a broadband access network of a telecommunications network and/or for execution of network attachment tasks and/or further functional or configuration tasks within the central office point of delivery, wherein the central office point of delivery and/or the broadband access network comprises
access network facing nodes, and
a control function and/or a switching fabric and/or service edge nodes, wherein execution of the network attachment tasks and/or the further functional or configuration tasks within the central office point of delivery involves using an execution state database as well as stateless execution service functionalities being assigned to different execution stages realized within the central office point of delivery, and a message bus connecting the different execution stages, wherein the execution stages comprise at least an access stage, a processing stage, and a device stage, wherein the execution service functionalities—in order to process or execute the network attachment tasks and/or the further functional or configuration tasks—generate and consume messages on and from the message bus, wherein the method comprises the following steps:

in a first step, receiving, by a first execution service functionality assigned to or part of the access stage, a trigger request regarding a network attachment task and/or a further functional or configuration task, and in response to receiving the trigger request, generating, by the first execution service functionality, at least a first message on the message bus;

in a second step, consuming, by a second execution service functionality assigned to or part of the processing stage, the first message on the message bus, and in response to consuming the first message, generating, by the second execution service functionality, at least a second message on the message bus; and in a third step, consuming, by a third execution service functionality assigned to or part of the device stage, the second message on the message bus, and in response to consuming the second message, configuring, by the third execution service functionality, the control function and/or the switching fabric and/or the access network facing nodes and/or the service edge nodes.

2. The method according to claim 1, wherein the processing stage comprises a customer stage, a service stage, and a setup and configuration stage, the customer stage comprising a fourth execution service functionality, the service stage comprising a fifth execution service functionality, and the setup and configuration stage comprising a sixth execution service functionality, and wherein the method further comprises:

in a fourth step, consuming, by the fourth execution service functionality, the first message on the message bus, and generating, by the fourth execution service functionality, at least a fourth message on the message bus;

in a fifth step, consuming, by the fifth execution service functionality, the fourth message on the message bus, and generating, by the fifth execution service functionality, at least a fifth message on the message bus; and in a sixth step, consuming, by the sixth execution service functionality, the fifth message on the message bus, and generating, by the sixth execution service functionality, at least the second message on the message bus to be consumed, in the third step, by the third execution service functionality.

3. The method according to claim 2, wherein upon the reception—by the first execution service functionality—of the trigger request regarding the network attachment task and/or regarding the further functional or configuration task, and upon the generation of at least the first message, the implemented sequence of stages are run through even in case that a stage is not actively involved in processing respective messages related to a specific type of trigger request.

4. The method according to claim 2, wherein the first message comprises all necessary pieces of information for the processing stage or for the customer stage; and/or
wherein the second message comprises all necessary pieces of information for the device stage; and/or
wherein the fourth message comprises all necessary pieces of information for the service stage; and/or
wherein the fifth message comprises all necessary pieces of information for the setup and configuration stage.

5. The method according to claim 2, wherein a respective trigger request regarding a network attachment task corresponds to a port-up message, especially regarding an access network facing node, which is received by the first execution service functionality, wherein the first execution service functionality generates generic data from the port-up message;
wherein the fourth execution service functionality determines a user or customer, and wherein generating at least the fourth message comprises generating at least the fourth message comprising all available customer data of a customer database;
wherein the sixth execution service functionality generating at least the second message comprises the sixth execution service functionality generating at least the second message comprising service edge information; and
wherein the second message being consumed by the third execution service functionality corresponds to configuring the access network facing nodes.

6. The method according to claim 2, wherein a respective trigger request regarding a Radius request or regarding accounting data or regarding a change-of-authorization event is received by the first execution service functionality, corresponding to a service edge, wherein the first execution service functionality generates generic data regarding the respective trigger request;
wherein the fourth execution service functionality determines a user or customer, and wherein generating at least the fourth message comprises generating at least the fourth message comprising all available customer data of a customer database;
wherein the sixth execution service functionality generating at least the second message comprises the sixth execution service functionality generating at least the second message comprising a request to send a Radius response corresponding to the Radius request; and
wherein the second message being consumed by the third execution service functionality corresponds to sending a Radius response corresponding to the respective trigger request.

7. The method according to claim 1, wherein the network attachment task prepares and configures the central office point of delivery and the access network facing nodes to enable IP session setup; and
wherein the further functional or configuration task is to:
process an external control plane request, especially a Radius request in view of or during an IP session setup, or a change of authorization request especially regarding an access network facing node of the broadband access network; and/or
send accounting data related to a user of the broadband access network or to a plurality of users.

8. The method according to claim 1, wherein the switching fabric comprises a plurality of spine network nodes and a plurality of leaf network nodes, wherein at least part of the leaf network nodes realize one or a plurality of functionalities of one or a plurality of the service edge nodes.

9. The method according to claim 1, wherein the messages are transmitted or generated, on the message bus, as part of an array of messages or as part of a transaction of messages.

10. A system for operation of a central office point of delivery within a broadband access network of a telecommunications network and/or for execution of network attachment tasks and/or further functional or configuration tasks within the central office point of delivery, the system comprising:
the central office point of delivery; and
the broadband access network;
wherein the central office point of delivery and/or the broadband access network comprises:
access network facing nodes; and
a control function and/or a switching fabric and/or service edge nodes;
wherein the execution of the network attachment tasks and/or the further functional or configuration tasks within the central office point of delivery involves using an execution state database as well as stateless execution service functionalities being assigned to different execution stages realized within the central office point of delivery, and a message bus connecting the different execution stages, wherein the execution stages comprise at least an access stage, a processing stage, and a device stage, wherein the execution service functionalities—in order to process or execute the network attachment tasks and/or the further functional or configuration tasks—generate and consume messages on and from the message bus;
wherein a first execution service functionality assigned to or part of the access stage is configured to receive a trigger request regarding a network attachment task and/or a further functional or configuration task, and generate, in response to receiving the trigger request at least a first message on the message bus;
wherein a second execution service functionality assigned to or part of the processing stage is configured to consume the first message on the message bus, and in response to consuming the first message generate at least a second message on the message bus; and
wherein a third execution service functionality assigned to or part of the device stage is configured to consume the second message on the message bus, and in response to consuming the second message, configure the control function and/or the switching fabric and/or the access network facing nodes and/or the service edge nodes.

11. A non-transitory computer-readable medium having processor-executable instructions stored thereon for operation of a central office point of delivery within a broadband access network of a telecommunications network and/or for execution of network attachment tasks and/or further functional or configuration tasks within the central office point of delivery,
wherein the central office point of delivery and/or the broadband access network comprises
access network facing nodes, and
a control function and/or a switching fabric and/or service edge nodes,
wherein execution of the network attachment tasks and/or the further functional or configuration tasks within the central office point of delivery involves using an execution state database as well as stateless execution service functionalities being assigned to different execution stages realized within the central office point of delivery, and a message bus connecting the different execution stages, wherein the execution stages comprise at least an access stage, a processing stage, and a device stage, wherein the execution service functionalities—in order to process or execute the network attachment tasks and/or the further functional or configuration tasks—generate and consume messages on and from the message bus, wherein the processor-executable instructions, when executed, facilitate performance of the following steps:

in a first step, receiving, by a first execution service functionality assigned to or part of the access stage, a trigger request regarding a network attachment task and/or a further functional or configuration task, and in response to receiving the trigger request, generating, by the first execution service functionality, at least a first message on the message bus;

in a second step, consuming, by a second execution service functionality assigned to or part of the processing stage, the first message on the message bus, and in response to consuming the first message, generating, by the second execution service functionality, at least a second message on the message bus; and in a third step, consuming, by a third execution service functionality assigned to or part of the device stage, the second message on the message bus, and in response to consuming the second message, configuring, by the third execution service functionality, the control function and/or the switching fabric and/or the access network facing nodes and/or the service edge nodes.

\* \* \* \* \*